(12) United States Patent
Benedict

(10) Patent No.: US 8,002,043 B2
(45) Date of Patent: Aug. 23, 2011

(54) SLOTTED THREAD PROTECTION DEVICE

(75) Inventor: Detlev Benedict, Nienhagen (DE)

(73) Assignee: Baker Hughes Incorporated, Houston, TX (US)

( * ) Notice: Subject to any disclaimer, the term of this patent is extended or adjusted under 35 U.S.C. 154(b) by 376 days.

(21) Appl. No.: 11/696,494

(22) Filed: Apr. 4, 2007

(65) Prior Publication Data
US 2007/0236004 A1    Oct. 11, 2007

Related U.S. Application Data

(60) Provisional application No. 60/789,311, filed on Apr. 5, 2006.

(51) Int. Cl.
*F16L 55/00* (2006.01)
*E21B 19/16* (2006.01)

(52) U.S. Cl. ............... 166/379; 175/325.2; 166/344; 166/77.51; 285/45

(58) Field of Classification Search ........... 175/323, 175/325.2; 166/344, 381, 380; 285/334; 29/437, 545; 277/343, 603, 611, 626, 638, 277/649
See application file for complete search history.

(56) References Cited

U.S. PATENT DOCUMENTS

| | | |
|---|---|---|
| 1,344,028 A | 6/1920 | Ewald |
| 1,378,015 A * | 5/1921 | Erickson .................. 285/39 |
| 1,489,065 A | 4/1924 | Clifton |
| 1,543,963 A | 6/1925 | Walton |
| 1,840,312 A | 1/1932 | Dunmire |
| 2,762,638 A | 9/1956 | Brown |
| 2,766,054 A | 10/1956 | Everhart |
| 2,849,245 A | 8/1958 | Baker |
| 3,208,757 A | 9/1965 | Jageman |
| 3,692,336 A * | 9/1972 | Zon .................. 285/148.19 |
| 4,647,072 A | 3/1987 | Westman |
| 4,655,256 A * | 4/1987 | Lasota et al. ............ 138/96 T |
| 4,655,479 A | 4/1987 | Farr |
| 5,160,172 A | 11/1992 | Gariepy |
| 5,188,402 A * | 2/1993 | Colgate et al. ............ 285/332 |
| 5,485,870 A | 1/1996 | Kraik |
| 5,637,806 A | 6/1997 | Baryshnikov et al. |

(Continued)

FOREIGN PATENT DOCUMENTS

EP        0692608 A1      1/1996

(Continued)

*Primary Examiner* — David J Bagnell
*Assistant Examiner* — Brad Harcourt
(74) *Attorney, Agent, or Firm* — Mossman, Kumar & Tyler, PC

(57) ABSTRACT

A thread protection member for protecting threads in a threaded joint includes a body formed of a material selected to reduce damage to the threads during a make-up of the threaded joint and a discontinuity reducing remaining clamping forces and thus allowing the body to deform in a predetermined manner when the body is removed from the threaded joint. In one arrangement, the discontinuity is a void at least partially penetrating the body. For example, the void can be a longitudinal slot that extends partially or fully through the body. In another embodiment, the discontinuity is a region in the body that has at least one material property different from a material property of an adjacent portion of the body. To remove the thread protection member from the joint, a suitable tool may be used to deform the body to extract the body from the joint.

17 Claims, 4 Drawing Sheets

U.S. PATENT DOCUMENTS

| | | | |
|---|---|---|---|
| 5,857,716 A * | 1/1999 | Thomas | 285/143.1 |
| 6,192,999 B1 * | 2/2001 | Nguyen | 175/340 |
| 6,371,224 B1 | 4/2002 | Freeman et al. | |
| 2003/0094312 A1 * | 5/2003 | Byrd | 175/325.1 |
| 2003/0156918 A1 * | 8/2003 | Benedict et al. | 411/81 |

FOREIGN PATENT DOCUMENTS

| | | |
|---|---|---|
| EP | 1519001 | 3/2005 |
| GB | 949289 | 2/1964 |
| IT | 01283507 | 4/1998 |

* cited by examiner

SLOTTED THREAD PROTECTION DEVICE

CROSS-REFERENCE TO RELATED APPLICATIONS

This application takes priority from U.S. Provisional Patent Application Ser. No. 60/789,311, filed Apr. 5, 2006.

BACKGROUND OF THE DISCLOSURE

1. Field of the Disclosure

The present disclosure relates to systems for forming tubular strings for use in a wellbore.

2. Description of the Related Art

Threaded connections are a prevalent method to join two or more members such as pipe sections, drill strings, such as drill collars, drill bit bushings, centralizers, shock collars, directional tools, casing, tubing, line pipe, flow lines and subsurface production tools. Make-up or connection of such threaded joints can require very high torque. Because the thread faces of such joints can be subjected to high bearing stresses as well as harsh mounting conditions there is a risk that these loads will gall and damage the threaded joint.

One method of protecting joints from damage such as galling is to apply an anti-seize compound between the mating threads. Such a compound inhibits the "welding" that may otherwise occur under the pressures and heat incurred during proper make-up. Exemplary compounds usually contain finely divided metal powder such as zinc or lead and sometimes other ingredients such as active sulfur. Experience has shown that these compounds may degrade over time or under the influence of the extreme operating conditions, which can lead to loss of their anti-galling properties. Furthermore, many of these compounds are now classified as hazardous substances because of their high metal particle content.

U.S. Pat. No. 6,371,224 (the '224 patent) reports that Italian Patent 980421 to Baryshnikov et al. describes a threaded spacer which is intended to replace conventional thread compounds. Referring now to FIG. 1, there is isometrically illustrated a threaded spacer generally representative of the devices described in the '224 patent and Italian Patent 980421. The '224 patent explains that "the particular threaded spacer [10] disclosed is composed of a conical section [12] having a flange [14] at its open, larger end [16]. Cooperating helical grooves [18] are formed in the inside and outside surfaces of the conical section wall [20] such that the conical wall, as a whole, is undulating in cross section." The '224 patent further explains that the conical section 12 of the spacer 10 can be received between mating grooves of adjacent drill pipe sections, while the flange will fill the annular space defined between the shoulders of adjacent pipe sections. Thereafter, the '224 patent describes "a new process . . . for making threaded spacers of the type shown in Italian Patent 980421."

During use, the described prior art thread saving device is subjected to relatively high torques, high contact forces and high friction forces. Partly because this prior art thread saving device may be very thin, perhaps 0.25 millimeters thick in the conical areas, the operating loads can deform or crush the prior art thread saving device to a point where the prior art thread saving device cannot be readily removed from either the male end or the female end of the pipe joint. In such cases, it can be a time consuming process to break apart or extract the prior art thread saving device from the joint, which usually is often required, e.g., after each run downhole for the purpose of crack inspection.

The present disclosure addresses these and other drawbacks of this prior art thread saving device.

SUMMARY OF THE DISCLOSURE

In aspects, the present disclosure provides a thread protection member for protecting one or more of male and female threads in a threaded connection between two tubular members. In one embodiment, the thread protection member includes a body seating between the male and female threads in the threaded joint. The body is formed of a material such as a copper-beryllium alloy that can reduce damage to the threads during mounting/dismounting of the threaded joint. The body includes a discontinuity that reduces its stiffness in circumferential and radial direction and thus allows the body to easily deform in a predetermined manner in order to minimize remaining clamping forces on the members of the threaded joint. Generally speaking, the discontinuity can include a localized removal of material or a localized reduction of a value of a material property such as tensile strength, ductility, hardness, etc. In one arrangement, the discontinuity is a void at least partially penetrating the body. For example, the void can be a longitudinal slot formed at least partially along a longitudinal axis of the body. In other arrangements, the discontinuity is a region having at least one material property different from a material property of an adjacent portion of the body. For example, the region can be more ductile or more brittle than the adjacent areas of the body due to a mechanical and/or chemical treatment or even the use of an insert integrated into a wall of thread protection member.

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein:

FIG. 2C sectionally illustrates an embodiment of a thread protection member made in accordance with the present disclosure positioned between a pin end and a box end of a threaded joint;

DESCRIPTION OF THE PREFERRED EMBODIMENTS

Figure 1:
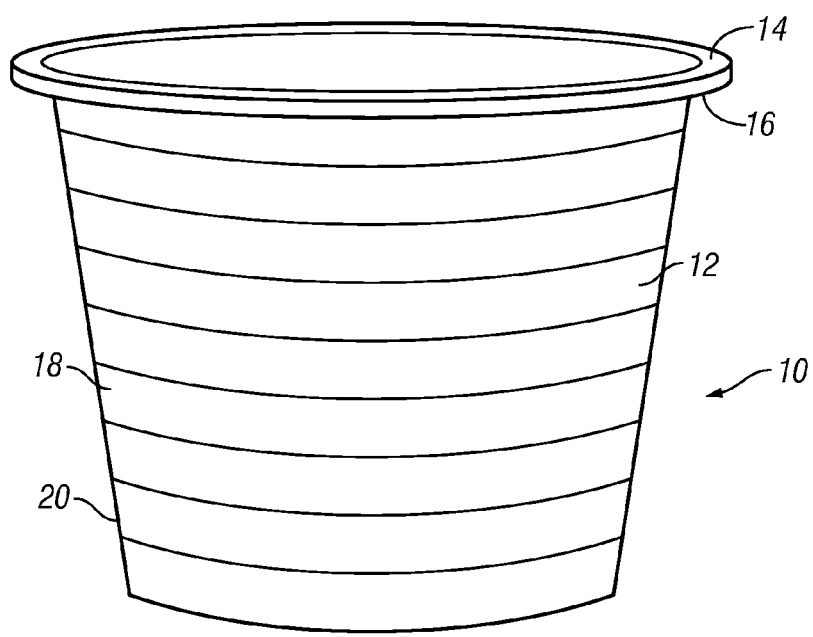
FIG. 1 isometrically illustrates a prior art thread saving device.

The present disclosure relates to devices and methods for thread protection devices. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Figure 2A:
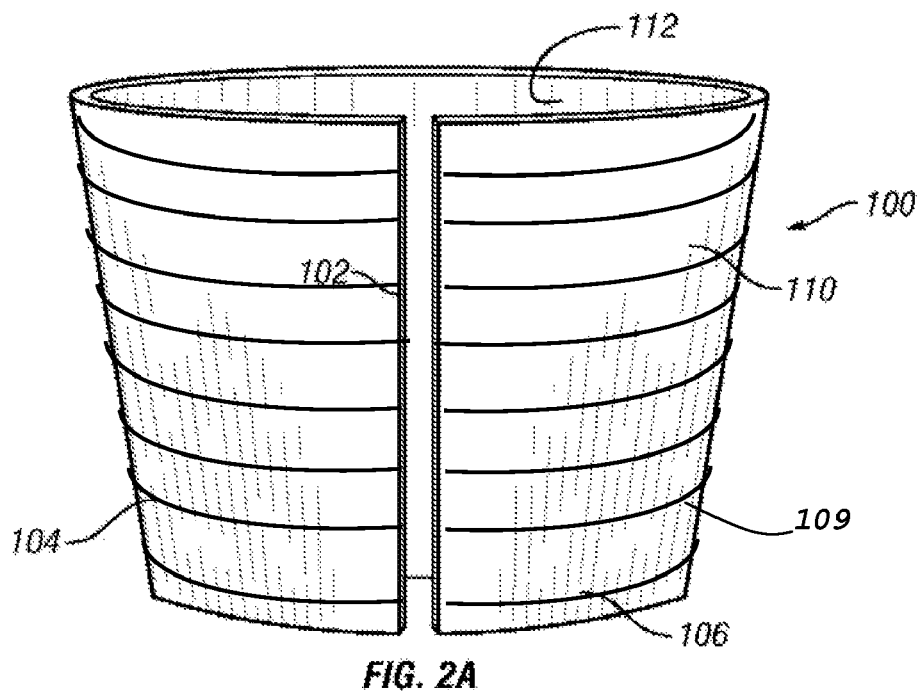
FIGS. 2A and 2B each schematically illustrate an embodiment of a thread protection member made in accordance with the present disclosure.

Referring initially to FIG. 2A and FIG. 2C, there is isometrically illustrated one embodiment of a thread protection member 100 made in accordance with the present disclosure. The thread protection member 100 is at least partially formed of a material having suitable material properties such as high electrical conductivity, high strength, corrosion resistance, formability, low coefficient of sliding friction and resistance to wear and resistance to galling when mated with steel or other ferrous or non-ferrous metal. Exemplary metals include, but are not limited to copper-beryllium alloy. The thread protection member 100 is formed to have one or more material property discontinuities that facilitate removal or disassembly of the thread protection member 100 from members of a threaded joint 54. The discontinuity can include a localized removal of material or a localized reduction of a value of a material property such as tensile strength, ductility, hardness, etc. In FIG. 2A, an elongated void 102 is formed in a body 104 of the member 100. The void 102 can be pre-formed during manufacture or machined in after manufacture. The void 102 can in some embodiments be in the order of 0 to 20 millimeters in width. The body 104 has a conical end 106, an exterior surface 110 and an interior surface 112 that can include helical grooves or undulations 109 that generally conform with threads formed on the joints 54. The grooves 54 can be customized for a particular thread form or be generically formed for a plurality of thread forms. Thus, one method of employing the thread protection member 100 is to rotate the thread protection member 100 onto the joint 54 such that the grooves 109 engage the threads in the pin and box ends 50, 52 of the joint 54.

The void 102 assists in removal of the thread protection member 100 in a number of ways. One way the void 102 facilitates removal is by making the body 104 sufficiently flexible or deformable such that the thread protection member 100 can be twisted or rotated out of engagement with the joint. As described earlier, the interior and exterior surfaces of the body 104 can have helical grooves or undulations 109 formed thereon that generally conform to the threads of the joint 54 to be protected. A conventional thread protection member, if sufficiently crushed or deformed, may be very difficult if not impossible to unscrew from a joint using conventional tools. Advantageously, the void 102 can enable to the body 104 to flex sufficiently to reduce forces such as sliding friction between the surfaces 110 or 112 of the body 104 such that conventional tools can be used to unscrew and remove the thread protection member 100 from the joint 54. In this removal mode, the body 104 is not permanently damaged such as fragmented or permanently deformed.

Another way the void 102 facilitates removal is by providing access to the interior surface 112 or an exterior surface 110 of the thread protection member 100. For example, due to deformation, the member 100 may become stuck on a pin end of a tubular member (not shown). For example, this access can be useful during the removal process since a tool (not shown) such as a chisel can be inserted through the void 102 and wedged between the interior surface 112 and the tubular member. Thereafter, the tool (not shown) can be manipulated as needed to pry the body 104 off the tubular member. A similar procedure would be used if the member 100 was stuck on a box or female end of the tubular member.

Still another way the void 102 facilitates removal is by selectively weakening the body 104 of the thread protection member 100 such that a reduced amount of force is needed to fracture or deform the thread protection member 100 for removal. As is generally known, a continuous cylindrical structure, such as that shown in FIG. 1, can retain a substantial amount of structural integrity even after deformation. Thus, if the prior art thread saver 100 becomes stuck on a threaded joint, the retained integrity must be overcome to fracture or disintegrate the prior art thread saver 100. One or more voids 102 formed in the body 104 can reduce the structural integrity by allowing the body 104 to deform in a manner that allows the body 104 to be dislodged from the threaded joint. For example, the void 102 can allow the body 104 to bend, flex or twist. This deformation can, for example, increase the diameter of the body 104 such that the body 104 can be removed from a pin end of a joint or decrease the diameter of the body 104 such that the body 104 can be removed from a box end of a joint. The deformation can be permanent or temporary such that the thread protection member can be reused. The void 102 can also permit the body 104 to fracture or disintegrate into multiple smaller pieces. The smaller pieces can more easily removed from a tubular joint.

Figure 2B:
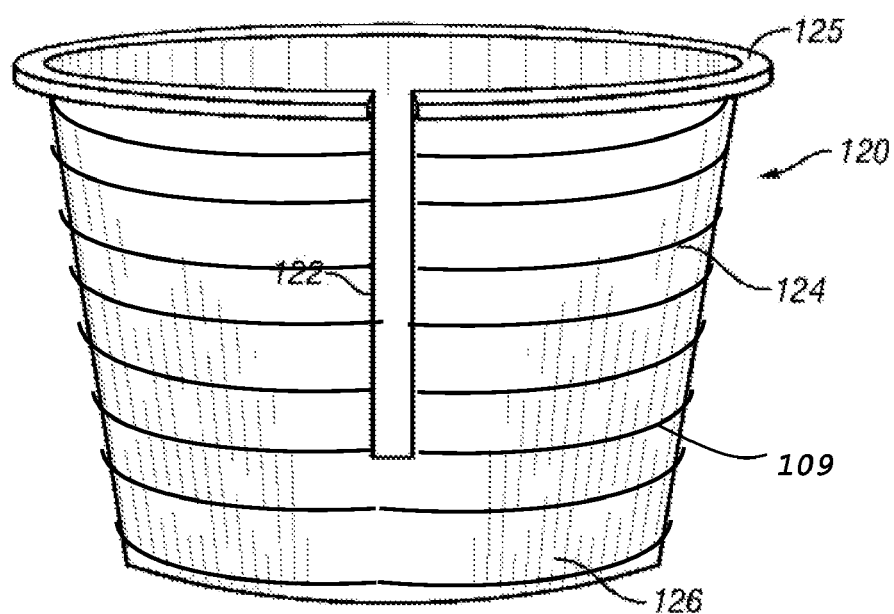

While the void 102 is shown as an elongated longitudinal slot that extends fully through the body 104, it should be understood that the void 102 can take any form and be of any number that is functionally effective to facilitate removal of the thread protection member 100. For example, referring now to FIG. 2B, there is shown another embodiment of a thread protection member 120 wherein a void 122 is formed only partially through a body 124 of the member 120. A bridge portion 126 provides structural continuity for at least a portion of the body 124. The size of the bridge portion 126 can be controlled or adjusted to provide a selective amount of structural integrity for the body 124. Moreover, while the bridge 126 is shown as at an end of the body 124, the bridge 126 can also be formed at any point intermediate of the ends of the body 124. Of course, two or more bridge portions 126 can also be advantageous in some situations. The bridge portion 126 can be advantageous, for instance, in applications where a particular amount of structural integrity is desired to ensure that the body 124 can withstand the forces associated with joint make-up (e.g., applied torque) and/or the forces applied during use. Additionally, the body 124 can include two or more voids and the voids can be formed at any desired angle. It should also be noted that the body 124 of the FIG. 2B embodiment includes an optional flange 125. The flange 125 can be formed integral with the body 124 or be formed as a separate element. The flange 125 can also be utilized with the embodiment shown in FIG. 2A. It should be understood, however, that the flange 125 is merely an optional feature that may be omitted in certain embodiments.

Figure 3A:
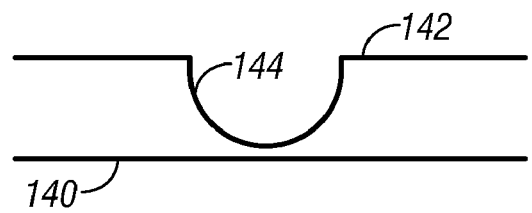
FIGS. 3A-C schematically illustrate embodiments of discontinuities for a thread protection member made in accordance with the present disclosure.
Figure 3B:
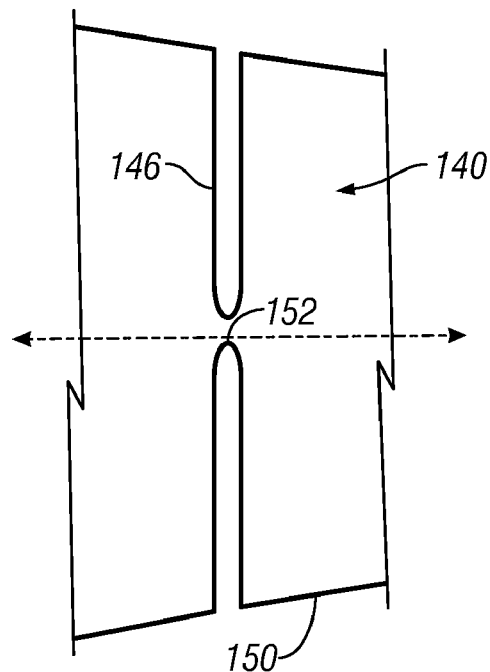
Figure 3C:
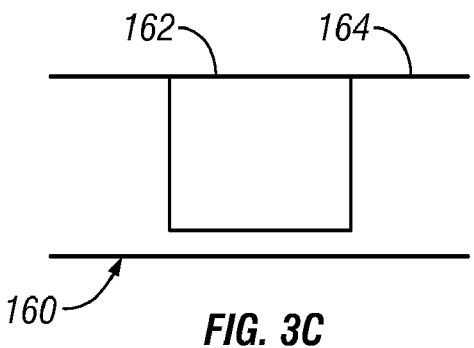

Referring now to FIGS. 3A-B, there are shown sections of a thread protection member 140 wherein further exemplary discontinuities are shown in a wall 142. Discontinuity 144 is a partial void in a form of a longitudinal groove that does not fully radially penetrate the wall 142. Discontinuity 146 is an annular or circumferential void 148 formed on the wall 150 that includes a bridge portion 152. These discontinuities 144, 146 can be configured as desired to perform one or more of the functions previously described. Thus, it should be appreciated that a discontinuity in the form of a void can be oriented in any particular direction or angle and can partially or fully penetrate the body of a thread protection member. In other embodiments of the present disclosure, a discontinuity is formed by employing devices and methods other than forming voids. Referring now to FIG. 3C, there is shown a section of a thread protection member 160 wherein one or more material properties in a region 162 in a wall 164 have been altered to facilitate removal of the thread protection member 160. For example, the material properties in the region 162 can be made more ductile or made more brittle. Any number of methods can be used to alter the material properties of the region 162. For example, the region 162 can undergo a mechanical treatment or be treated with one or more suitable chemicals. In still other embodiments, the region 162 can include an insert made of a material different from that of the material of the thread protection member 160. The insert can, for example, be welded or otherwise integrated or melded into the wall 164 of thread protection member 160.

Figure 4:
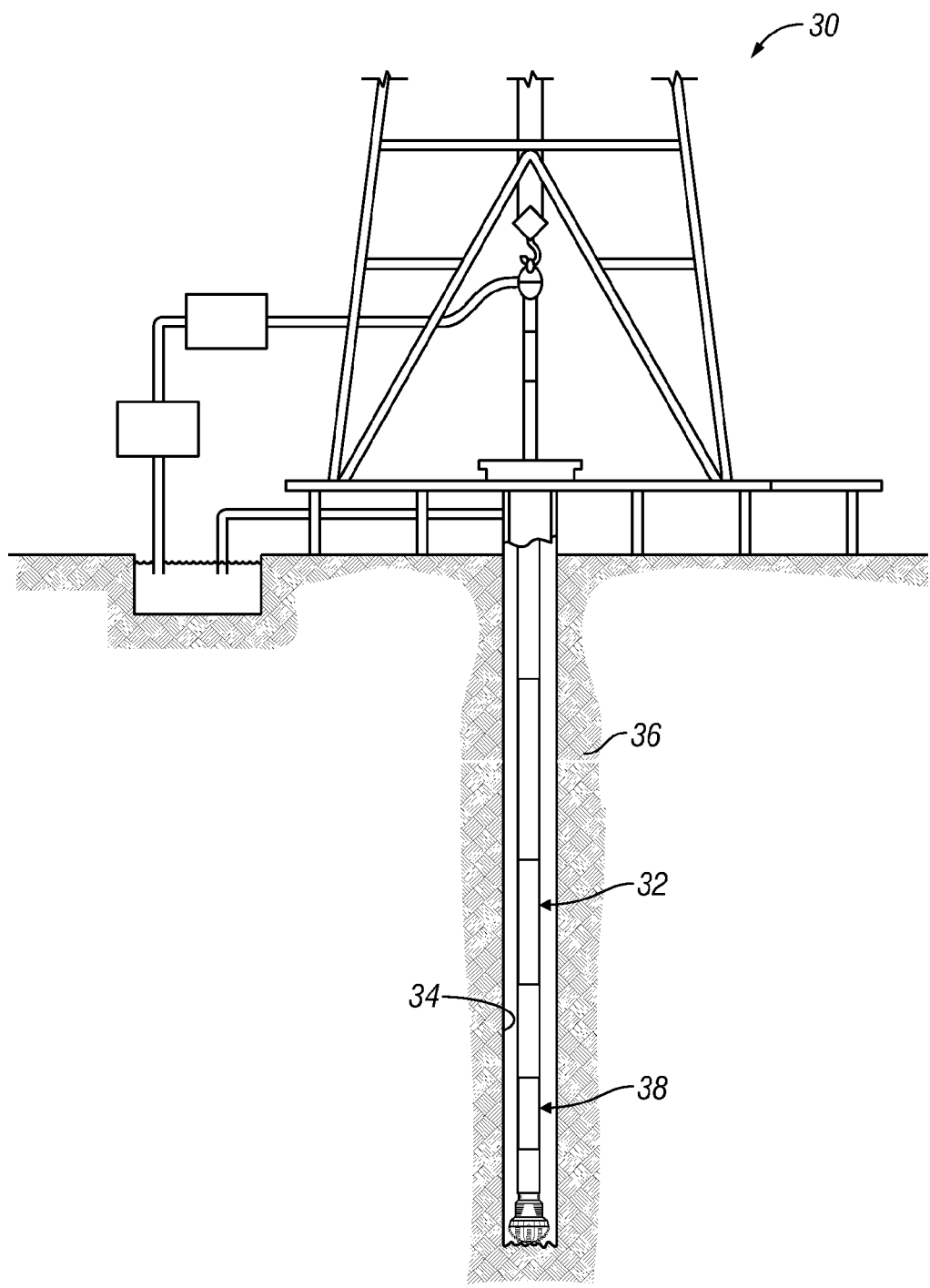
FIG. 4 schematically illustrates a well construction system in which one or more of thread protection members made in accordance with the present disclosure can be utilized.

Referring now to FIG. 4 there is shown a schematic diagram of a well construction system 30 having one or more well tools 32 shown conveyed in a borehole 34 formed in a formation 36. A string 38, such as a tool string, work string, or drill string, extends downward from the surface into the borehole 34. The string 38 and well tool 32 can include any type of equipment including a steerable drilling assembly, a drilling motor, measurement-while-drilling assemblies, formation evaluation tools, drill collars or drill pipe. The connections between these tools and devices typically utilize pin-box or male-female connector arrangements. Since the string 38 can be several thousand feet long, there may well be hundreds of threaded joints made-up within the string 38. Thread protection devices made in accordance with the present disclosure, such as those shown in FIGS. 2A, B and 3A-C, upon installation into the joints of the string 38 protect these joints from galling and other such damage during make-up. Thus, the tubular joints of the string 38 can be re-used for further operations because the threads formed on their pin and box ends have been largely preserved from damage. Further, during break-out or disassembly of the string 38, the discontinuities provided in the thread protection members reduce the time and effort required to extract the thread protection devices from their respective joints. For instance, these discontinuities can enable surface personnel to easily unscrew or break up the thread protection device into several pieces and/or allow personnel to use tooling suitable for mechanically deforming the thread protection device in a manner that allows the thread protection device to be removed from the joint.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. An apparatus for protecting a threaded connection between two tubulars, comprising:
    a body positioned at the threaded connection, the body including a void that fully radially penetrates the body and is formed as a longitudinal slot formed fully along a longitudinal axis of the body, an interior surface having undulations for mating with a pin end of the threaded connection, and an exterior surface having undulations for mating with a box end of the threaded connection.

2. The apparatus of claim 1 wherein the void reduces a stiffness of the body in an amount that allows the body to flex during removal of the body from the threaded connection.

3. The apparatus of claim 1 wherein the discontinuity is a region having at least one material property different from a material property of an adjacent portion of the body.

4. The apparatus of claim 1 wherein the void is configured to allow the body to deform by one of: (i) increasing in diameter, and (ii) decreasing in diameter.

5. An apparatus for protecting a threaded connection between two tubulars, comprising:
    a body positioned at the threaded connection connecting the two tubulars, the body reducing damage to the threaded connection during a make-up of the threaded connection, the body including a slot formed fully along a longitudinal axis of the body that allows the body to deform in a predetermined manner, an interior surface having undulations for mating with a pin end of the threaded connection, and an exterior surface having undulations for mating with a box end of the threaded connection.

6. A method for forming a connection between two tubular members having a threaded connection, comprising:
    positioning a body between threaded surfaces associated with the two tubular members, the body including a discontinuity allowing the body to deform in a predetermined manner, wherein the discontinuity reduces a stiffness of the body and the body includes an interior surface having undulations and an exterior surface having undulations, and wherein each tubular member has a pin end and a box end; and
    removing the body from the two tubular members by flexing the body.

7. The method of claim 6 further comprising fracturing the body at a location weakened by the discontinuity to remove the body from the threaded connection.

8. The method of claim 7 further comprising removing the body from the threaded connection by one of: (i) increasing a diameter of the body, and (ii) decreasing the diameter of the body.

9. The method of claim 6 further comprising forming the discontinuity as a void that fully penetrates the body.

10. The method of claim 9 wherein the void is formed as a longitudinal slot formed fully along a longitudinal axis of the body.

11. The method of claim 6 forming the discontinuity in a region having at least one material property different from a material property of an adjacent portion of the body.

12. A system for deploying a wellbore tool in a wellbore formed in a subsurface formation, comprising:
    (a) a plurality of tubular members interconnected by a plurality of threaded connections, each tubular member of the plurality of members having a pin end and a box end; and
    (b) a body seated within at least two threaded connections of the plurality of threaded connections, each body reducing damage to at least one threaded connection, each body including a void that reduces a stiffness of the body and allows the body to deform in a predetermined manner.

13. The system of claim 12 wherein the void fully penetrates the body.

14. The system of claim 13 wherein the void is formed as a slot formed at least partially along a longitudinal axis of the body.

15. The system of claim 12 wherein the discontinuity is a region having at least one material property different from a material property of an adjacent portion of the body.

16. The system of claim 12 wherein the body may deform by one of: (i) bending, (ii) twisting, (iii) flexing, (iv) increasing in diameter, and (v) decreasing in diameter.

17. The system of claim 12 wherein the body includes a plurality of bodies, each of which is seated at one threaded connection of the plurality of threaded connections, and wherein each body has an interior surface having undulations for mating with the threaded connection and an exterior surface having undulations for mating with the threaded connection.

* * * * *